(12) United States Patent
Gonzales et al.

(10) Patent No.: US 12,514,748 B2
(45) Date of Patent: *Jan. 6, 2026

(54) APPARATUS AND METHODS FOR TREATMENT OF OBSTRUCTIVE SLEEP APNEA UTILIZING CRYOLYSIS OF ADIPOSE TISSUES

(71) Applicant: Cryosa, Inc., Arden Hills, MN (US)

(72) Inventors: Donald A. Gonzales, Folsom, LA (US); Anthony Natale, New Preston, CT (US)

(73) Assignee: CRYOSA, INC., Arden Hills, MN (US)

( * ) Notice: Subject to any disclaimer, the term of this patent is extended or adjusted under 35 U.S.C. 154(b) by 368 days.

This patent is subject to a terminal disclaimer.

(21) Appl. No.: 18/298,161

(22) Filed: Apr. 10, 2023

(65) Prior Publication Data

US 2023/0240887 A1 Aug. 3, 2023

Related U.S. Application Data

(63) Continuation of application No. 16/399,264, filed on Apr. 30, 2019, now abandoned, which is a
(Continued)

(51) Int. Cl.
*A61F 7/12* (2006.01)
*A61B 18/00* (2006.01)
(Continued)

(52) U.S. Cl.
CPC ............... *A61F 7/12* (2013.01); *A61B 18/02* (2013.01); *A61B 2018/00172* (2013.01);
(Continued)

(58) Field of Classification Search
CPC ........................................... A61F 7/12
See application file for complete search history.

(56) References Cited

U.S. PATENT DOCUMENTS 3,712,306 A 1/1973 Bryne
3,889,680 A 6/1975 Armao
(Continued)

FOREIGN PATENT DOCUMENTS

AU 2011279923 B2 2/2016
AU 2018226785 A1 10/2019
(Continued)

OTHER PUBLICATIONS

Chakrabarti, P. et al., "FoxO1 controls insulin-dependent adipose triglyceride lipase (ATGL) expression and lipolysis in adipocytes," Journal of biological chemistry, 2009, vol. 284, No. 20, pp. 13296-13300.
(Continued)

*Primary Examiner* — Kaitlyn E Smith
(74) *Attorney, Agent, or Firm* — Perkins Coie LLP

(57) ABSTRACT

Methods, devices, and systems employ cryolysis of oropharyngeal adipose tissues to selectively remove fat cells from the tissues causing obstructive sleep apnea. In various embodiments, a chilled liquid—e.g., a liquid or air—is applied to the target tissue at a temperature and for a duration sufficient to cause cryolysis.

12 Claims, 10 Drawing Sheets

Related U.S. Application Data continuation of application No. 15/949,897, filed on Apr. 10, 2018, now Pat. No. 11,419,757, which is a continuation of application No. 15/238,652, filed on Aug. 16, 2016, now Pat. No. 10,111,774, which is a continuation of application No. 14/736,447, filed on Jun. 11, 2015, now Pat. No. 9,439,805, which is a continuation of application No. 13/359,000, filed on Jan. 26, 2012, now Pat. No. 9,078,634.

(60) Provisional application No. 61/441,207, filed on Feb. 9, 2011, provisional application No. 61/436,712, filed on Jan. 27, 2011.

(51) Int. Cl.
*A61B 18/02* (2006.01)
*A61F 7/00* (2006.01)

(52) U.S. Cl.
CPC ............ *A61B 2018/00291* (2013.01); *A61B 2018/00327* (2013.01); *A61B 2018/00464* (2013.01); *A61B 2018/00642* (2013.01); *A61B 2018/00714* (2013.01); *A61B 2018/00791* (2013.01); *A61B 2018/0212* (2013.01); *A61B 2018/0262* (2013.01); *A61B 2018/0293* (2013.01); *A61F 2007/001* (2013.01); *A61F 2007/0063* (2013.01); *A61F 2007/0096* (2013.01)

(56) References Cited

U.S. PATENT DOCUMENTS

| | | | |
|---|---|---|---|
| 5,245,023 A | 9/1993 | Peoples et al. | |
| 5,250,430 A | 10/1993 | Peoples et al. | |
| 5,534,432 A | 7/1996 | Peoples et al. | |
| 5,663,063 A | 9/1997 | Peoples et al. | |
| 5,743,904 A | 4/1998 | Edwards | |
| 5,800,379 A | 9/1998 | Edwards et al. | |
| 6,017,337 A | 1/2000 | Pira | |
| 6,032,675 A | 3/2000 | Rubinsky | |
| 6,041,787 A | 3/2000 | Rubinsky | |
| 6,045,549 A | 4/2000 | Smethers et al. | |
| 6,126,657 A | 10/2000 | Edward et al. | |
| 6,245,537 B1 | 6/2001 | Williams et al. | |
| 6,316,262 B1 | 11/2001 | Huisman et al. | |
| 6,378,525 B1 | 4/2002 | Beyar et al. | |
| 6,408,851 B1 | 6/2002 | Karell | |
| 6,514,515 B1 | 2/2003 | Williams et al. | |
| 6,548,569 B1 | 4/2003 | Williams et al. | |
| 6,555,123 B2 | 4/2003 | Williams et al. | |
| 6,585,994 B2 | 7/2003 | Williams et al. | |
| 6,592,892 B1 | 7/2003 | Williams et al. | |
| 6,593,116 B1 | 7/2003 | Huisman et al. | |
| 6,607,517 B1 * | 8/2003 | Dae | A61F 7/12 607/106 |
| 6,610,764 B1 | 8/2003 | Martin et al. | |
| 6,623,749 B2 | 9/2003 | Williams et al. | |
| 6,689,589 B2 | 2/2004 | Huisman et al. | |
| 6,746,447 B2 | 6/2004 | Davison et al. | |
| 6,746,685 B2 | 6/2004 | Williams et al. | |
| 6,770,071 B2 | 8/2004 | Woloszko et al. | |
| 6,828,357 B1 | 12/2004 | Martin et al. | |
| 6,838,493 B2 | 1/2005 | Williams et al. | |
| 6,867,247 B2 | 3/2005 | Williams et al. | |
| 6,867,248 B1 | 3/2005 | Martin et al. | |
| 6,878,758 B2 | 4/2005 | Martin et al. | |
| D568,258 S | 5/2008 | Adam | |
| 7,367,341 B2 | 5/2008 | Anderson et al. | |
| 7,458,932 B2 | 12/2008 | Sun | |
| 7,507,235 B2 | 3/2009 | Keogh et al. | |
| 7,575,870 B1 | 8/2009 | Lalvani et al. | |
| 7,713,266 B2 | 5/2010 | Elkins et al. | |
| 7,842,029 B2 | 11/2010 | Anderson et al. | |
| 7,850,683 B2 | 12/2010 | Elkins et al. | |
| 7,854,754 B2 | 12/2010 | Ting et al. | |
| 7,862,558 B2 | 1/2011 | Elkins et al. | |
| 7,998,137 B2 | 8/2011 | Elkins et al. | |
| 8,192,474 B2 | 6/2012 | Levinson et al. | |
| 8,275,442 B2 | 9/2012 | Allison | |
| 8,285,390 B2 | 10/2012 | Levinson et al. | |
| 8,287,579 B2 | 10/2012 | Nimitz | |
| 8,298,216 B2 | 10/2012 | Burger et al. | |
| 8,337,539 B2 | 12/2012 | Ting et al. | |
| 8,409,185 B2 | 4/2013 | Burger et al. | |
| 8,523,927 B2 | 9/2013 | Levinson et al. | |
| 8,603,073 B2 | 12/2013 | Allison | |
| 8,676,338 B2 | 3/2014 | Levinson et al. | |
| 8,702,774 B2 | 4/2014 | Baker et al. | |
| 8,715,275 B2 | 5/2014 | Burger et al. | |
| 8,768,468 B2 | 7/2014 | Garcia et al. | |
| 8,834,547 B2 | 9/2014 | Anderson et al. | |
| 8,840,608 B2 | 9/2014 | Anderson et al. | |
| 9,033,966 B2 | 5/2015 | McKay | |
| 9,039,688 B2 | 5/2015 | Palmer et al. | |
| 9,072,498 B2 | 7/2015 | Elkins et al. | |
| 9,078,634 B2 | 7/2015 | Gonzales et al. | |
| 9,101,346 B2 | 8/2015 | Burger et al. | |
| 9,113,855 B2 | 8/2015 | Burger et al. | |
| 9,254,162 B2 | 2/2016 | Burger et al. | |
| 9,295,512 B2 | 3/2016 | Allison et al. | |
| 9,308,120 B2 | 4/2016 | Anderson et al. | |
| 9,314,290 B2 | 4/2016 | Fourkas et al. | |
| 9,345,526 B2 | 5/2016 | Elkins et al. | |
| 9,402,676 B2 | 8/2016 | Babkin et al. | |
| 9,408,745 B2 | 8/2016 | Levinson et al. | |
| 9,439,805 B2 | 9/2016 | Gonzales et al. | |
| 9,545,523 B2 | 1/2017 | Nanda | |
| 9,610,112 B2 | 4/2017 | Karnik et al. | |
| 9,844,461 B2 | 12/2017 | Levinson et al. | |
| 9,861,421 B2 | 1/2018 | O'Neil et al. | |
| 9,907,693 B2 | 3/2018 | Burger et al. | |
| 9,980,765 B2 | 5/2018 | Avram et al. | |
| 10,085,881 B2 | 10/2018 | Karnik et al. | |
| 10,092,346 B2 | 10/2018 | Levinson et al. | |
| 10,111,774 B2 | 10/2018 | Gonzales et al. | |
| 10,201,380 B2 | 2/2019 | DeBenedictis et al. | |
| 10,213,244 B2 | 2/2019 | Fourkas et al. | |
| 10,363,080 B2 | 7/2019 | Elkins et al. | |
| 10,441,459 B2 | 10/2019 | Aronhalt et al. | |
| 10,470,813 B2 | 11/2019 | Allison et al. | |
| 10,568,759 B2 | 2/2020 | Yee et al. | |
| 10,575,890 B2 | 3/2020 | DeBenedictis et al. | |
| 10,582,960 B2 | 3/2020 | Avram et al. | |
| 10,596,030 B2 | 3/2020 | Karnik et al. | |
| 10,646,666 B2 | 5/2020 | Cohn et al. | |
| 10,675,178 B2 | 6/2020 | Levinson et al. | |
| 10,806,500 B2 | 10/2020 | DeBenedictis et al. | |
| 10,864,112 B2 | 12/2020 | Burger et al. | |
| 10,869,779 B2 | 12/2020 | Burger et al. | |
| 10,888,366 B2 | 1/2021 | Allison et al. | |
| 10,912,599 B2 | 2/2021 | O'Neil et al. | |
| 10,939,947 B2 | 3/2021 | Burger et al. | |
| 11,076,879 B2 | 8/2021 | Yee et al. | |
| 11,116,566 B2 | 9/2021 | Dinger et al. | |
| 11,154,418 B2 | 10/2021 | Frangineas | |
| 11,253,393 B2 | 2/2022 | Karnik et al. | |
| 11,272,972 B2 | 3/2022 | Allison et al. | |
| 11,284,934 B2 | 3/2022 | Lazarus et al. | |
| 11,324,673 B2 | 5/2022 | Velis et al. | |
| 11,419,757 B2 * | 8/2022 | Gonzales | A61F 7/10 |
| 11,437,150 B2 | 9/2022 | Rondoni et al. | |
| 11,439,532 B2 | 9/2022 | Vellis | |
| 11,446,175 B2 | 9/2022 | Jimenez Lozano et al. | |
| 11,446,178 B2 | 9/2022 | Velis | |
| D967,164 S | 10/2022 | Mairs et al. | |
| 11,457,971 B2 | 10/2022 | Wolf et al. | |
| 11,478,643 B2 | 10/2022 | Verzal et al. | |
| 11,504,322 B2 | 11/2022 | Garibyan et al. | |
| 11,510,722 B2 | 11/2022 | Wolf et al. | |
| 11,511,117 B2 | 11/2022 | Ni et al. | |
| D971,935 S | 12/2022 | Mairs et al. | |
| D971,936 S | 12/2022 | Mairs et al. | |

(56) References Cited

U.S. PATENT DOCUMENTS

| | | |
|---|---|---|
| D971,937 S | 12/2022 | Mairs et al. |
| D971,950 S | 12/2022 | Mairs et al. |
| 11,517,365 B1 | 12/2022 | Mazor et al. |
| 11,534,335 B2 | 12/2022 | Gonzales et al. |
| 11,583,438 B1 | 2/2023 | Levinson et al. |
| 2002/0026226 A1 | 2/2002 | Ein |
| 2002/0062831 A1 | 5/2002 | Beyar et al. |
| 2002/0164729 A1 | 11/2002 | Skraly et al. |
| 2003/0060685 A1 | 3/2003 | Houser |
| 2003/0069572 A1 | 4/2003 | Wellman |
| 2003/0220374 A1 | 11/2003 | Needleman |
| 2003/0220674 A1 | 11/2003 | Anderson et al. |
| 2004/0234576 A1 | 11/2004 | Martin et al. |
| 2004/0249416 A1 | 12/2004 | Yun et al. |
| 2005/0043682 A1 | 2/2005 | Kucklick |
| 2005/0133026 A1 | 6/2005 | Seleznev et al. |
| 2006/0235264 A1 | 10/2006 | Vassallo |
| 2007/0010861 A1 | 1/2007 | Anderson et al. |
| 2007/0129714 A1 | 6/2007 | Elkins et al. |
| 2007/0144539 A1 | 6/2007 | van der Burg et al. |
| 2007/0154538 A1 | 7/2007 | Neuberger et al. |
| 2007/0163603 A1 | 7/2007 | Sikora |
| 2007/0198071 A1 | 8/2007 | Ting et al. |
| 2007/0255362 A1 | 11/2007 | Levinson et al. |
| 2007/0270925 A1 | 11/2007 | Levinson et al. |
| 2008/0023012 A1 | 1/2008 | Dineen et al. |
| 2008/0058584 A1 | 3/2008 | Hirotsuka et al. |
| 2008/0066769 A1 | 3/2008 | Dineen et al. |
| 2008/0066864 A1 | 3/2008 | Ballantine et al. |
| 2008/0077201 A1 | 3/2008 | Levinson et al. |
| 2008/0077202 A1 | 3/2008 | Levinson et al. |
| 2008/0077211 A1 | 3/2008 | Levinson et al. |
| 2008/0083461 A1 | 4/2008 | Viken |
| 2008/0132891 A1 | 6/2008 | Nobis |
| 2008/0183164 A1 | 7/2008 | Elkins et al. |
| 2008/0188947 A1 | 8/2008 | Sanders |
| 2008/0200910 A1 | 8/2008 | Burger et al. |
| 2008/0287839 A1 | 11/2008 | Rosen et al. |
| 2009/0014012 A1 | 1/2009 | Sanders |
| 2009/0018623 A1 | 1/2009 | Levinson et al. |
| 2009/0018624 A1 | 1/2009 | Levinson et al. |
| 2009/0018625 A1 | 1/2009 | Levinson et al. |
| 2009/0018626 A1 | 1/2009 | Levinson et al. |
| 2009/0018627 A1 | 1/2009 | Levinson et al. |
| 2009/0107001 A1 | 4/2009 | McCarty |
| 2009/0118722 A1 | 5/2009 | Ebbers et al. |
| 2009/0120446 A1 | 5/2009 | Vaska et al. |
| 2009/0123886 A1 | 5/2009 | Vaska et al. |
| 2009/0149929 A1 | 6/2009 | Levinson et al. |
| 2009/0192504 A1 | 7/2009 | Askew |
| 2009/0287060 A1 | 11/2009 | Pell et al. |
| 2009/0287210 A1 | 11/2009 | Kauphusman |
| 2010/0057065 A1 | 3/2010 | Krimsky |
| 2010/0081971 A1 | 4/2010 | Allison |
| 2010/0100089 A1 | 4/2010 | Niethammer |
| 2010/0152824 A1 | 6/2010 | Allison |
| 2010/0280582 A1 | 11/2010 | Baker |
| 2011/0066216 A1 | 3/2011 | Ting et al. |
| 2011/0155143 A1 | 6/2011 | Shantha |
| 2011/0166598 A1 | 7/2011 | Gonzales et al. |
| 2011/0224761 A1 | 9/2011 | Manstein |
| 2011/0238050 A1 | 9/2011 | Allison et al. |
| 2011/0238051 A1 | 9/2011 | Levinson et al. |
| 2011/0300079 A1 | 12/2011 | Martin et al. |
| 2012/0022518 A1 | 1/2012 | Levinson et al. |
| 2012/0085174 A1 | 4/2012 | Urbano |
| 2012/0239123 A1 | 9/2012 | Weber et al. |
| 2012/0265186 A1 | 10/2012 | Burger |
| 2013/0066309 A1 | 3/2013 | Levinson et al. |
| 2013/0079684 A1 | 3/2013 | Rosen et al. |
| 2013/0116758 A1 | 5/2013 | Levinson et al. |
| 2013/0116759 A1 | 5/2013 | Levinson et al. |
| 2013/0158440 A1 | 6/2013 | Allison |
| 2013/0158636 A1 | 6/2013 | Ting et al. |
| 2013/0245731 A1 | 9/2013 | Allison |
| 2013/0253384 A1 | 9/2013 | Anderson et al. |
| 2013/0253494 A1 | 9/2013 | Anderson et al. |
| 2013/0253495 A1 | 9/2013 | Anderson et al. |
| 2013/0253496 A1 | 9/2013 | Anderson et al. |
| 2014/0005760 A1 | 1/2014 | Levinson et al. |
| 2014/0067025 A1 | 3/2014 | Levinson et al. |
| 2014/0257443 A1 | 9/2014 | Baker et al. |
| 2014/0277219 A1 | 9/2014 | Nanda |
| 2014/0277302 A1 | 9/2014 | Weber et al. |
| 2014/0316393 A1 | 10/2014 | Levinson et al. |
| 2015/0047301 A1 | 2/2015 | Messersi |
| 2015/0148791 A1 | 5/2015 | Birdsall et al. |
| 2015/0216719 A1 | 8/2015 | DeBenedictis et al. |
| 2015/0216720 A1 | 8/2015 | DeBenedictis et al. |
| 2015/0216816 A1 | 8/2015 | O'Neil et al. |
| 2015/0251120 A1 | 9/2015 | Jakop |
| 2016/0022345 A1 | 1/2016 | Baust et al. |
| 2016/0051401 A1 | 2/2016 | Yee et al. |
| 2016/0183997 A1 | 6/2016 | Burnett et al. |
| 2016/0324576 A1 | 11/2016 | Ebbutt |
| 2016/0338752 A1 | 11/2016 | Sperling |
| 2016/0354234 A1 | 12/2016 | Dabrowiak |
| 2017/0079833 A1 | 3/2017 | Frangineas et al. |
| 2017/0105869 A1 | 4/2017 | Frangineas et al. |
| 2017/0196731 A1 | 7/2017 | DeBenedictis et al. |
| 2017/0239079 A1 | 8/2017 | Root et al. |
| 2017/0325992 A1 | 11/2017 | DeBenedictis et al. |
| 2017/0325993 A1 | 11/2017 | Lozano et al. |
| 2017/0326042 A1 | 11/2017 | Zeng et al. |
| 2017/0326346 A1 | 11/2017 | Lozano et al. |
| 2018/0185081 A1 | 7/2018 | O'Neil et al. |
| 2018/0206900 A1 | 7/2018 | Sperling |
| 2018/0235805 A1 | 8/2018 | Burger et al. |
| 2019/0069949 A1 | 3/2019 | Vrba et al. |
| 2019/0151006 A1 | 5/2019 | Fourkas et al. |
| 2019/0192873 A1 | 6/2019 | Schwarz et al. |
| 2019/0197361 A1 | 6/2019 | Gonzales et al. |
| 2019/0254867 A1 | 8/2019 | Gonzales et al. |
| 2019/0290347 A1 | 9/2019 | Elkins et al. |
| 2020/0046552 A1 | 2/2020 | Velis et al. |
| 2020/0069458 A1 | 3/2020 | Pham |
| 2020/0138501 A1 | 5/2020 | DeBenedictis et al. |
| 2020/0206024 A1 | 7/2020 | Karnik et al. |
| 2020/0222103 A1 | 7/2020 | Manstein |
| 2020/0268439 A1 | 8/2020 | Frazier et al. |
| 2020/0323682 A1 | 10/2020 | O'Connor et al. |
| 2020/0375647 A1 | 12/2020 | Alphandery et al. |
| 2021/0030457 A1 | 2/2021 | Avram et al. |
| 2021/0038278 A1 | 2/2021 | DeBenedictis et al. |
| 2021/0128219 A1 | 5/2021 | Allison et al. |
| 2021/0186585 A1 | 6/2021 | Burger et al. |
| 2021/0282829 A1 | 9/2021 | O'Neil et al. |
| 2021/0315626 A1 | 10/2021 | Xiao et al. |
| 2021/0322084 A1 | 10/2021 | Velis et al. |
| 2021/0353351 A1 | 11/2021 | Mazor et al. |
| 2022/0008110 A1 | 1/2022 | Velis et al. |
| 2022/0047315 A1 | 2/2022 | Baker et al. |
| 2022/0071802 A1 | 3/2022 | Christopherson et al. |
| 2022/0125630 A1 | 4/2022 | Karnik et al. |
| 2022/0133531 A1 | 5/2022 | Salma et al. |
| 2022/0226206 A1 | 7/2022 | Velis |
| 2022/0233863 A1 | 7/2022 | Rondoni et al. |
| 2022/0257272 A1 | 8/2022 | Wolf et al. |
| 2022/0265344 A1 | 8/2022 | Wolf et al. |
| 2022/0280788 A1 | 9/2022 | Verzal et al. |
| 2022/0288388 A1 | 9/2022 | Rondoni et al. |
| 2022/0296887 A1 | 9/2022 | Johnson et al. |
| 2022/0338892 A1 | 10/2022 | Iyer et al. |
| 2022/0346852 A1 | 11/2022 | Anderson et al. |
| 2022/0387091 A1 | 12/2022 | DeBenedictis et al. |
| 2022/0401725 A1 | 12/2022 | Dieken et al. |
| 2022/0401727 A1 | 12/2022 | Rondoni et al. |
| 2023/0000669 A1 | 1/2023 | Babkin et al. |
| 2023/0028322 A1 | 1/2023 | Velis et al. |
| 2023/0031549 A1 | 2/2023 | Velis et al. |
| 2023/0046154 A1 | 2/2023 | Mazor et al. |
| 2023/0046673 A1 | 2/2023 | Velis et al. |
| 2023/0054472 A1 | 2/2023 | Hill et al. |
| 2023/0069123 A1 | 3/2023 | Soykan et al. |

(56) References Cited

U.S. PATENT DOCUMENTS

| | | |
|---|---|---|
| 2023/0218433 A1 | 7/2023 | Gonzales et al. |
| 2024/0341830 A1 | 10/2024 | Kannan et al. |
| 2024/0341831 A1 | 10/2024 | Kannan et al. |
| 2025/0134915 A1 | 5/2025 | Gonzales et al. |
| 2025/0135004 A1 | 5/2025 | Gonzales et al. |

FOREIGN PATENT DOCUMENTS

| | | | |
|---|---|---|---|
| AU | 2020272238 | A1 | 10/2021 |
| AU | 2020412601 | A1 | 7/2022 |
| AU | 2021324991 | A1 | 3/2023 |
| CA | 3023821 | A1 | 11/2017 |
| CA | 3044020 | A1 | 7/2018 |
| CA | 3065606 | A1 | 9/2018 |
| CA | 3115260 | A1 | 4/2020 |
| CA | 3135707 | A1 | 10/2020 |
| CA | 3162660 | A1 | 7/2021 |
| CN | 108836619 | A | 11/2018 |
| EP | 1890627 | B1 | 6/2012 |
| EP | 2111172 | B1 | 10/2013 |
| EP | 2094328 | B1 | 8/2014 |
| EP | 2676623 | B1 | 9/2015 |
| EP | 2162083 | B1 | 12/2015 |
| EP | 2499984 | B1 | 1/2016 |
| EP | 2967706 | A1 | 1/2016 |
| EP | 2687174 | B1 | 10/2016 |
| EP | 3099258 | A1 | 12/2016 |
| EP | 3099260 | A2 | 12/2016 |
| EP | 3182918 | A1 | 6/2017 |
| EP | 2802279 | B1 | 8/2017 |
| EP | 3104796 | B | 4/2019 |
| EP | 3488833 | A1 | 5/2019 |
| EP | 3541345 | A1 | 9/2019 |
| EP | 3342379 | B1 | 10/2019 |
| EP | 3506846 | A4 | 1/2021 |
| EP | 3099262 | B1 | 2/2022 |
| EP | 4081746 | A1 | 11/2022 |
| GB | 2423023 | B | 10/2009 |
| HK | 40011648 | A | 7/2020 |
| IL | 266662 | A | 6/2019 |
| IL | 269038 | A | 10/2019 |
| JP | H01223961 | A | 9/1989 |
| JP | 2022126649 | A | 8/2022 |
| MX | 2019010396 | A | 7/2020 |
| SG | 11201908076 | | 9/2019 |
| SG | 11202103368 | | 4/2021 |
| SG | 11202103636 | | 5/2021 |
| WO | 9744092 | A1 | 11/1997 |
| WO | 9903411 | A1 | 1/1999 |
| WO | 2003078596 | A2 | 9/2003 |
| WO | 2007101039 | A1 | 9/2007 |
| WO | 2007127924 | A2 | 11/2007 |
| WO | 2007133839 | A1 | 11/2007 |
| WO | 2008016730 | A2 | 2/2008 |
| WO | 2008039556 | A1 | 4/2008 |
| WO | 2008039557 | A1 | 4/2008 |
| WO | 2008055243 | A2 | 5/2008 |
| WO | 2008060423 | A2 | 5/2008 |
| WO | 2008143678 | A1 | 11/2008 |
| WO | 2009011708 | A1 | 1/2009 |
| WO | 2009026471 | A1 | 2/2009 |
| WO | 2010036732 | A1 | 4/2010 |
| WO | 2010127315 | A2 | 11/2010 |
| WO | 2011091293 | A1 | 7/2011 |
| WO | 2011091431 | A1 | 7/2011 |
| WO | 2012012296 | A1 | 1/2012 |
| WO | 2012103242 | A1 | 8/2012 |
| WO | 2012103315 | A2 | 8/2012 |
| WO | 2014151850 | A2 | 9/2014 |
| WO | 2014151872 | A2 | 9/2014 |
| WO | 2016033384 | A1 | 3/2016 |
| WO | 2017223417 | A1 | 12/2017 |
| WO | 2018044825 | A1 | 3/2018 |
| WO | 2019046236 | A2 | 3/2019 |
| WO | 2020142519 | A1 | 7/2020 |
| WO | 2022169699 | A1 | 8/2022 |
| WO | 2022229277 | A1 | 11/2022 |
| WO | 2023278891 | A1 | 1/2023 |
| WO | 2023064528 | A1 | 4/2023 |

OTHER PUBLICATIONS

Decision of Dismissal of Amendment mailed Nov. 12, 2024 in Japanese Patent Application No. 2021-538451, 4 pages, with English Translation.
Examination Report mailed Aug. 15, 2024 in Canadian Patent Application No. 3,125,291, 5 pages.
Examination Report mailed Aug. 15, 2024 in Canadian Patent Application No. 3,168,812, 4 pages.
Examination Report mailed Jul. 10, 2024 in European Patent Application No. 19907538.3, 4 pages.
Examination Report mailed Sep. 16, 2024 in Australian Patent Application No. 2019419502, 4 pages.
Ichioka, M. et al., "Increased expression of macrophage-inducible C-type lectin in adipose tissue of obese mice and humans," Diabetes, 2011, vol. 60, pp. 819-826.
International Search Report and Written Opinion mailed Jan. 31, 2025 in International Patent Application No. PCT/US24/51836, 10 pages.
Keuper, M. et al., "An inflammatory micro-environment promotes human adipocyte apoptosis," Molecular and cellular endocrinology, 2011, vol. 339, pp. 105-113.
Office Action mailed Apr. 16, 2024 in Japanese Patent Application No. 2021-538451, 4 pages, English Translation.
Tanaka, M. et al., "Macrophage-inducible C-type lectin underlies obesity-induced adipose tissue fibrosis," Nature communications, 2014, vol. 5, article:4982, pp. 1-13.
Examination Report mailed Jul. 11, 2025 in Canadian Patent Application No. 3,125,291, 4 pages.
Invitation to Pay Additional Fees mailed Jul. 21, 2025 in International Patent Application No. PCT/US25/32063, 2 pages.
Invitation to Pay Additional Fees mailed Jul. 17, 2025 in International Patent Application No. PCT/US25/32067, 3 pages.
Avram, M.M. et al., "Cryolipolysis for Subcutaneous Fat Layer Reduction." Lasers in Surgery and Medicine, 41: 703-708 (2009).
Coleman, S.R. et al., "Clinical Efficacy of Noninvasive Cryolipolysis and Its Effects on Peripheral Nerves." Aesth. Plast. Surg., 33: 482-488 (2009).
Day et al., "Popsicle Panniculitis." Pediatric Emergency Care; 8(2); 91-93, Apr. 1992.
Epstein et al.; Popsicle Panniculitis; NEJM; 282(17); 966-9867; Apr. 23, 1070.
Extended European Search Report mailed Apr. 9, 2018 in European Patent Application No. 15846755.5, 9 pages.
Extended European Search Report mailed Aug. 19, 2022 in European Patent Application No. 19907538.3, 8 pages.
Extended European Search Report mailed Dec. 15, 2023 in European Patent Application No. 21756850.0, 8 pages.
Gage et al., "Critical temperature for skin necrosis in experimental cryosurgery." Cryobiology; 19(3); 273-282, Jun. 1982.
International Search Report mailed Dec. 28, 2015 in International Patent Application No. PCT/US15/51903, 10 pages.
International Search Report mailed Jun. 29, 2021 in International Patent Application No. PCT/US21/18926, 12 pages.
International Search Report mailed Jun. 6, 2023 in International Patent Application No. PCT/US22/82620, 11 pages.
International Search Report mailed May 1, 2020 in International Patent Application No. PCT/US19/69113, 11 pages.
International Search Report mailed May 16, 2012 in International Patent Application No. PCT/US12/22697.
Kim et al., "Tongue fat and its relationship to obstructive sleep apnea." Sleep 37(10); 1638-1648, Oct. 2014.
MEDICALXPRESS: "Study shows that tongue seize and fat may predict sleep apnea risk in obese adults." 3 pages. Retrieved from the internet on Nov. 27, 2018 at <https://medicalxpress.com/news/2014-09-tongue-size-fat-apnea-obese.html>.

(56) References Cited

OTHER PUBLICATIONS

Nelson A.A. et al., "Cryolipolysis for Reduction of Excess Adipose Tissue." Semin. Cutan. Med. Surg., 28: 244-249 (2009).
Office Action mailed Jul. 18, 2017 in Canadian Patent Application No. 2,825,624, 3 pages.
Office Action mailed Jul. 18, 2018 in Canadian Patent Application No. 2,825,624, 4 pages.
Office Action mailed Jul. 25, 2023 in Japanese Patent Application No. 2021-538451, 7 pages, English Translation.
Office Action mailed Oct. 27, 2021 in Canadian Patent Application No. 2,962,920, 5 pages.
Office Action mailed Sep. 13, 2023 in Canadian Patent Application No. 3,168,812, 4 pages.
Office Action mailed Sep. 22, 2023 in Canadian Patent Application No. 3, 125,291, 5 pages.
Rajkumar et al., "Popsicle Panniculitis of the Cheeks." Clinical Pediatrics; 15(7); 619-621; Jul. 1976.
Zelickson, B et al., "Cryolipolysis for Noninvasive Fat Cell Destruction: Initial Results from a Pig Model." Dermatol. Surg., 35: 1462-1470 (2009).

\* cited by examiner

APPARATUS AND METHODS FOR TREATMENT OF OBSTRUCTIVE SLEEP APNEA UTILIZING CRYOLYSIS OF ADIPOSE TISSUES

CROSS REFERENCE TO RELATED APPLICATIONS

This application is a continuation of U.S. application Ser. No. 16/399,264, filed Apr. 30, 2019, which is a continuation of U.S. application Ser. No. 15/949,897, filed Apr. 10, 2018, now U.S. Pat. No. 11,419,757, which is a continuation of U.S. application Ser. No. 15/238,652, filed Aug. 16, 2016, now U.S. Pat. No. 10,111,774, which claims priority as a continuation to U.S. application Ser. No. 14/736,447, filed Jun. 11, 2015, now U.S. Pat. No. 9,439,805, which is a continuation of U.S. application Ser. No. 13/359,000, filed Jan. 26, 2012, now U.S. Pat. No. 9,078,634, the entire contents of which are hereby incorporated by reference herein, which claims priority to and the benefits of, and incorporates by reference herein, U.S. Provisional Application Nos. 61/436,712, filed Jan. 27, 2011, and 61/441,207, filed Feb. 9, 2011.

BACKGROUND

1. Field of the Invention

The present invention relates generally to cryolytic treatment of obstructive sleep apnea.

2. Description of Related Art

Obstructive sleep apnea (OSA) is disease that affects up to 20% of the adult population. OSA generally occurs during sleep when soft tissue obstructs the airway and creates cessation of, or impedes, breathing. Obstruction can occur at one or more levels including the retropalatal and retrolingual areas. Surgical correction of such obstructions remains a challenge, specifically for the retrolingual area. Removal or ablation of tongue tissue has been utilized with poor results due to complications, such as severe bleeding, abscess formation, and/or the inability to move the tongue anterior enough to relieve the obstruction.

It is known that patients with OSA have a higher percentage of adipose deposits in the areas of obstruction, specifically, the soft palate and uvula, base of tongue and lateral pharyngeal walls. The adipose tissue may be up to or greater than 40% of the total volume of tissues in these areas. Removal of the fat deposits in these areas would permit relief from OSA symptoms while preserving surrounding tissue. To date, however, cryolytic treatment of OSA has involved procedures analogous to ablation, merely substituting cryolytic cold for electrolytic heat and nonselectively destroying tissue in a similar manner—and with the same complications.

SUMMARY OF THE DISCLOSURE

The present invention employs cryolysis in a tissue-selective manner, selectively removing fat cells from the tissues causing OSA (e.g., oropharyngeal tissues), and exploits the fact that fat cells are more easily damaged by cooling than skin cells.

Lipolysis is presently used to "dissolve" fat cells by nonsurgical means. A number of methods have been attempted for lipolysis including the application of laser radiation, ultrasound, and radiofrequency electric current. Because fat cells are more easily damaged by cooling than the tough outer skin surface, cryolysis of adipose tissues (sometimes referred to as "cryolipolysis") has been employed by cooling tissue via thermal conduction in a controlled fashion i.e., selecting the temperature level and exposure to avoid skin damage or frostbite and selectively damaging only the underlying fat cells. While the process is not fully understood, it appears that fatty or adipose tissue that is cooled below body temperature but above freezing undergoes localized cell death followed by a local inflammatory response (a local panniculitis) that gradually, over the course of several months, reduces the volume of the fatty tissue layer.

In various embodiments, the present invention exploits the particular cryolytic vulnerability of adipose tissue to treat OSA without damaging and/or reducing the function of oropharyngeal tissue. Certain embodiments may comprise engagement members that are formed in the shape of each specific area to be cooled. Some embodiments may utilize graspers capable of grasping or pinching anatomical structures (soft palate, base of tongue, soft tissue of the pharynx) associated with OSA, thereby cooling the tissue between the gripping portions and ensuring good mechanical contact during cooling. In some embodiments, the cooling device may pierce the mucosa to cool the underlying tissues. The cooling device may also inject a cooling agent into the underlying tissue.

Accordingly, in a first aspect, the invention pertains to a device for treatment of obstructive sleep apnea. In various embodiments, the device comprises a cooling unit for chilling a cooling fluid and an applicator for receiving the cooling fluid; the applicator is configured for contact with oropharyngeal tissue, and the applicator and cooling unit cooperatively cause cooling of the oropharyngeal tissue to a temperature between approximately 5° C. and approximately −25° C. for approximately one to approximately thirty minutes, whereby a volume of adipose tissue in the contacted oropharyngeal tissue is subsequently reduced. In various embodiments, the applicator comprises an engagement member complementary to a target portion of the oropharyngeal tissue, and the applicator further includes a recirculation conduit for facilitating heat transfer between the engagement member and the cooling fluid. In some implementations the engagement member is flexible and conformal, while in other implementations is rigid—e.g., a substantially flat plate; "C"-shaped and complementary to a base of a tongue; or "V"-shaped and configured to engage a soft palate or a uvula. A rigid engagement member may be hinged, and the applicator may further include a control member (such as a wire) facilitating closure of the engagement member to grasp tissue. If desired, the cooling unit may be configured to provide suction to the engagement member to enhance mechanical contact thereof with the oropharyngeal tissue. In other embodiments, the applicator comprises a needle configured for injection of the cooling fluid into the target portion of the oropharyngeal tissue.

In various embodiments, the cooling fluid is a liquid, e.g., a refrigerant or a water and glycerine solution. The cooling unit may be configured for feedback operation to maintain a substantially constant temperature at the target portion of the oropharyngeal tissue. To facilitate this, the applicator may be associated with a temperature sensor to which the cooling unit is responsive.

In other embodiments, the cooling fluid is chilled air. For example, the applicator may comprise a tube for introducing the chilled air into the oropharynx and an inflatable member for sealing the esophagus and preventing the chilled air from entering the lower respiratory tract. In various implementations, the tube comprises inner and outer coaxial lumens, where the inner lumen has a portion extending past an end of the outer lumen and an inflatable member thereon; the cooling unit sends chilled air through the outer lumen and breathable air through the inner lumen. In other embodiments the cooling fluid is a chilled biocompatible liquid, and the applicator comprises a tube for introducing the liquid into the oropharynx and an inflatable member for sealing the esophagus and preventing aspiration.

In the ensuing discussion, any embodiment of any of the present devices methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. The term "consists essentially of" means excluding other materials that contribute to function, unless otherwise defined herein. Nonetheless, such other materials may be present, collectively or individually, in trace amounts.

The term "coupled" is defined as connected, although not necessarily directly, and not necessarily mechanically; two items that are "coupled" may be integral with each other. The terms "a" and "an" are defined as one or more unless this disclosure explicitly requires otherwise. The terms "substantially," "approximately," and "about" are defined as largely but not necessarily wholly what is specified, as understood by a person of ordinary skill in the art. In various embodiments, these terms connote ±10% and in some embodiments ±5%.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps. For example, in a method that comprises providing a tongue-stabilization device, the method includes the specified steps but is not limited to having only those steps. For example, such a method could also include inserting the device through an incision into the tongue of a patient.

Further, a device or structure that is configured in a certain way is configured in at least that way, but it can also be configured in other ways than those specifically described.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DESCRIPTION OF ILLUSTRATIVE EMBODIMENTS

Figure 1:
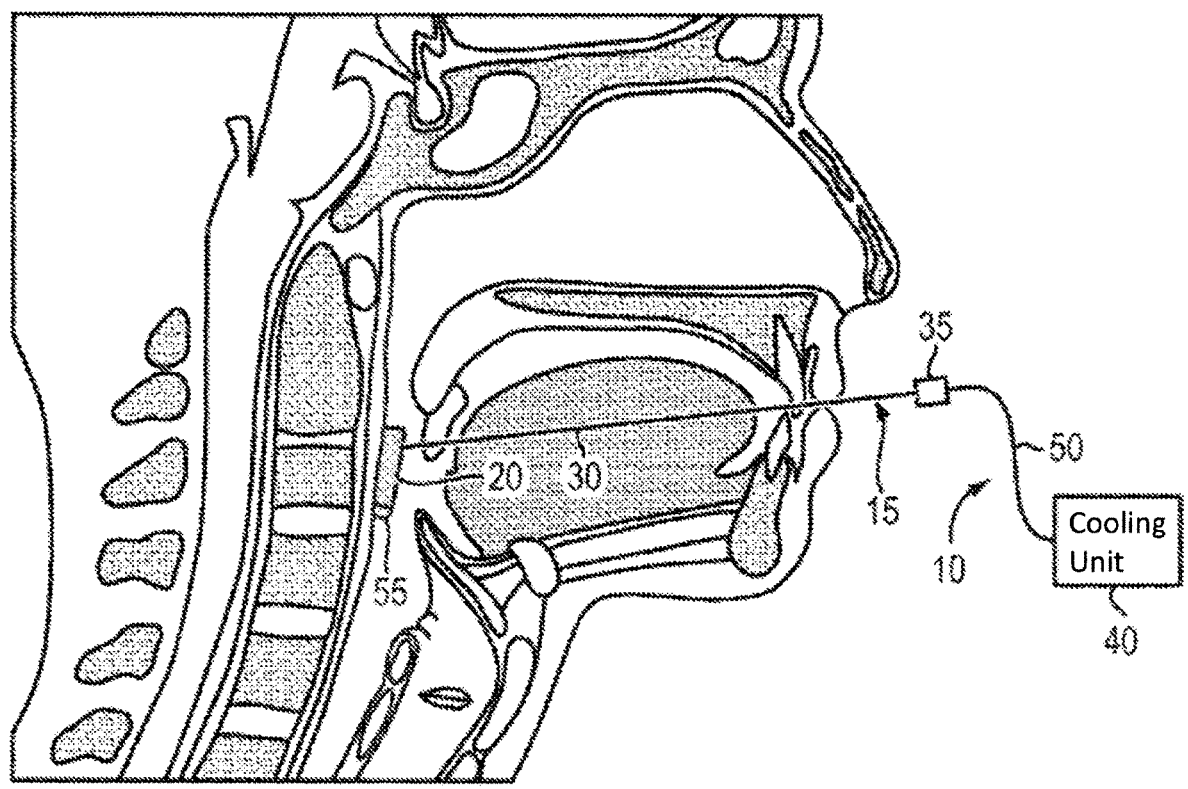
FIG. 1 depicts a side cross-sectional view of a human patient and a first exemplary embodiment of a cooling system.

Referring now to the drawings, and more particularly to FIG. 1 a cooling system 10 comprises a cooling device 15 including an engagement member 20 configured with a substantially flat plate to engage (i.e., rest against) the smooth surface of a patient's pharyngeal wall. In this embodiment cooling device 15 further comprises a shaft portion 30 and a coupling member 35 distal from engagement member 20. The shaft portion 30 is shown, for illustrative convenience, as extending directly from coupling member 35 to engagement member 20. If a straight, rigid shaft portion 30 is in fact employed, in use it would depress the tongue in order to allow engagement member 20 to access the oropharyngeal tissue target. Alternatively, shaft member 35 may be curved to extend over and around the tongue without depression thereof.

Coupling member 35 can be coupled to a cooling unit 40 via a conduit 50. It is understood that in certain exemplary embodiments, cooling device 15 may be used without cooling unit 40 as explained below. In this embodiment, cooling unit 40 can circulate a cooling agent (not visible in the pictures) through conduit 50 and cooling device 15 to maintain a desired temperature at the target tissue. In certain embodiments, cooling device 15 can be cooled to a temperature between approximately 0° C. and −20° C.

More particularly, in one embodiment, shaft portion 30 is a rigid structure having adjacent lumens through which a chilled cooling fluid is continually circulated past engagement member 20, thereby cooling the tissue with which engagement member 20 is in contact (or more accurately, withdrawing heat from the tissue). The lumens terminate in a pair of releasably engageable ports at the proximal end of shaft portion 30. Conduit 50, in this embodiment, comprises a pair of flexible fluid lines each having a separate coupling structure for engaging one of the ports, although the coupling structures are desirably integrated into a single engagement member 35. For example, the coupling structures may be snap-on sockets that receive and releasably engage flanged ends of the shaft ports in a fluid-tight manner; release of conduit 50 from shaft portion 30 may be effected, for example, using a thumb-operated tab on the coupling member 35. Alternatively, each conduit may have its own coupling member (e.g., a threaded cap or other conventional fluid-tight coupling) that individually and releasably engages one of the ports of shaft portion 20. The releasable coupling allows shaft portion 30 and engagement member 20 to be disposable or sterilizable, while conduits 50 are permanent.

Cooling unit 40 continually removes heat from the circulating coolant fluid to a heat sink and continuously provides the chilled coolant to shaft portion 30 and engagement member 20 via one fluid line while withdrawing coolant through the other fluid line. Examples of suitable circulating coolants include water, glycol, synthetic heat transfer fluid, oil, or a refrigerant. In specific embodiments, the coolant comprises or consists essentially of a water and solute solution. In one implementation, the coolant comprises or consists essentially of a water and glycerine solution comprising less than 45% glycerine by weight. The fluid lines of conduit 50 can be hoses made of polyethylene, polyvinyl chloride, polyurethane, or other flexible or rigid material that can accommodate the particular circulating coolant. Cooling unit 40 can be a refrigeration unit, a cooling tower, a thermoelectric chiller, or any other device capable of removing heat from a coolant. For example, cooling unit 40 can include one or more thermoelectric cooling elements, such as Peltier-type thermoelectric elements.

Cooling unit 40 may also include a processor for monitoring process parameters via one or more sensors. For example, a sensor 55 disposed within or against engagement member 20 can report the temperature of the engagement member 20, and the processor of cooling unit 20 may responsively adjust the degree of cooling of the circulating coolant; in this way, a desired temperature (or temperature range) is achieved and maintained in a closed-loop fashion via continuous feedback. The temperature sensor 55 may be connected to cooling unit via a wire along shaft portion 30; the wire terminates in an electrical coupling at the proximal end of shaft portion 30, and this coupling engages a complementary electrical coupling within coupling member 35 (and which is in electrical communication with cooling unit 40). Alternatively, the sensor may be wireless, and the processor of cooling unit 40 equipped to receive wireless signals from the sensor.

Alternatively or in addition, a temperature sensor may be located within cooling unit 40 to monitor the temperature of incoming fluid through one of the fluid lines 50. The relationship between fluid temperature at the sensor and the temperature of engagement member 20 may be determined by calibration, and the output of the sensor once again used in a closed-loop configuration to achieve and maintain a desired estimated temperature at engagement member 20.

The processor may be provided as either software, hardware, or some combination thereof. For example, the processor and control circuitry may be based on a server-class computer, such as a PC having a CPU board containing one or more processors such as the Core Pentium or Celeron family of processors manufactured by Intel Corporation of Santa Clara, Calif. The processor may also include a main memory unit for storing programs and/or data relating to the feedback control described above and more generally to operation of the cooling unit 40 during a procedure. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), or programmable logic devices (PLD). In some embodiments, the programs may be provided using external RAM and/or ROM such as optical disks, magnetic disks, as well as other commonly used storage devices. For embodiments in which the control functions are implemented by a software program, the program may be written in any one of a number of high level languages such as FORTRAN, PASCAL, JAVA, C, C++, C#, LISP, PERIL, BASIC, PYTHON or any suitable programming language. Additionally, the software can be implemented in an assembly language and/or machine language directed to a microprocessor.

During use, the engagement member 20 of cooling device 15 makes contact with the surface tissue overlying the adipose tissue of the pharyngeal wall. In exemplary embodiments, engagement member 20 may be placed in contact with the surface tissue for approximately one to thirty minutes. In particular embodiments, engagement member 20 may placed in contact with the surface tissue for approximately 15 minutes. As noted above, cooling device 15 can be cooled to and maintained at a temperature between approximately 0° C. and −20° C. (or, more generally, between approximately −25° C. and 5° C., typically at a selected temperature that is kept within a clinical tolerance range, e.g., ±10% or ±5%) during this contact time. The temperature and time should be sufficient to cause cryolysis of adipose tissues and selectively remove or reduce fat cells from the tissues in the pharyngeal wall; as mentioned earlier, this effect need not be immediate. Reducing the volume of adipose tissue in the pharyngeal wall eliminates or reduces OSA symptoms for the patient.

In certain embodiments, cooling device 15 may include a vacuum unit that provides suction at the engagement member 20 to enhance and maintain mechanical contact with the tissue of the pharyngeal wall. This may also provide a greater effective surface area of contact. For example, suction may be provided by a third lumen running along shaft member 30 but fluidly separate from the lumens through which cooling fluid circulates. The contact surface of engagement member 20 may be perforated to permit the suction to exert its effect across substantially the entire area of the contact surface, with the perforations being small enough to avoid actually drawing the tissue therein and risking damage. The feedback circuitry discussed above can monitor the applied suction both to prevent excessive force from being applied as well as to indicate to the clinician the adequacy of contact between the engagement member 20 and the pharyngeal tissue. This suction capability may be employed in any of the embodiments shown in FIGS. 1-3.

Figure 2:
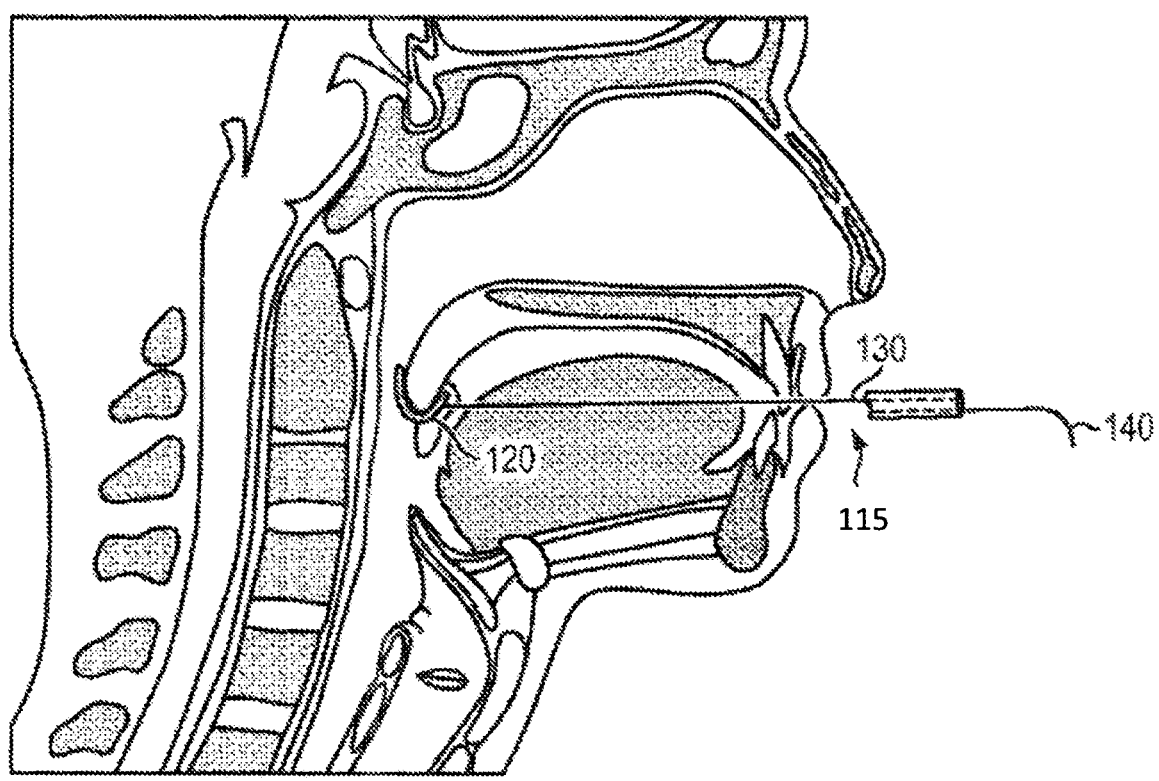
FIG. 2 depicts a side cross-sectional view of a human patient and a second exemplary embodiment of a cooling device.

Refer now to FIG. 2, which illustrates a cooling device 115 that is similar to cooling device 15 described above. In this embodiment cooling device 115 comprises a shaft portion 130 and an engagement member 120. Engagement member 120 has a "V" shape or "U" shape configured to engage the soft palate or uvula. During use, cooling device 115 operates similar to cooling device 15, with the exception that the area treated is in the soft palate and/or uvula, rather than the pharyngeal wall. The engagement member 120, in other words, is uvula-shaped or configured so as to be able to receive and retain the uvula or portion thereof. In one embodiment, the engagement member 120 is configured to be manipulable from an open configuration, which allows the clinician to conveniently cup the uvula within the engagement member 120, to a closed position the surrounds the uvula more snugly. This can be achieved, for example, using a hinged engagement member and a stiff wire 140 that the clinician may extend and retract through a third lumen running along the shaft member 130. The wire operates the engagement member so as, for example, to facilitate its hinged closure via retraction of the wire. Shape-memory alloys such as NITINOL are biocompatible and may be used to form the wire 140.

Figure 3:
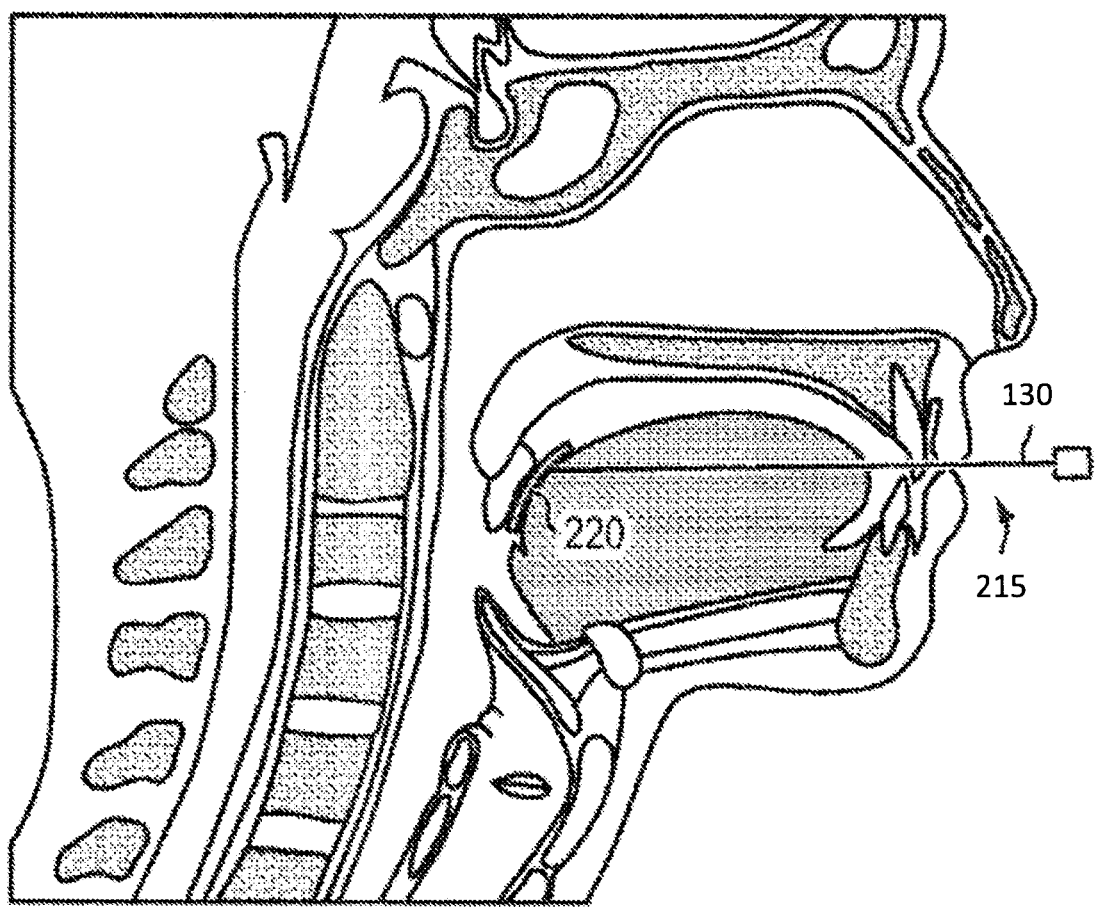
FIG. 3 depicts a side cross-sectional view of a human patient and a third exemplary embodiment of a cooling device.

With reference now to FIG. 3, a cooling device 215 is shown that is similar to cooling device 15 described above. In this embodiment cooling device 215 comprises a shaft portion 130 and an engagement member 220. Engagement member 220 has a "C" shape configured to engage the base of the patient's tongue—e.g., shaped to be complementary to the rear surface of the tongue opposite the uvula. During use, cooling device 215 operates in the manner described above regarding cooling device 15, with the exception that the area treated is in the base of the tongue, rather than the pharyngeal wall. It is understood that the embodiments shown in FIGS. 3 and 4 can be used with or without cooling unit shown in FIG. 1. For example, the cooling device 15 may be stored in a freezer and, following its removal just prior to use, maintain its cold temperature for a sufficient period of time to facilitate treatment as described herein—e.g., by incorporating an "ice pack" gel in or against the engagement member 20. Furthermore, any of the devices shown in FIGS. 1-3 may be hinged and operable via a wire to grasp the tissue after contact is established therewith.

In still other embodiments, the engagement member 20 is not rigid but is instead flexible and conformal. For example, engagement member 20 may take the form of a cushion, e.g., a bladder partially filled with air or other fluid so that it is soft and conforms when pressed up against oropharyngeal structures. For example, the fluid filling the bladder may be the same as that circulating through the shaft portion.

Figure 4:
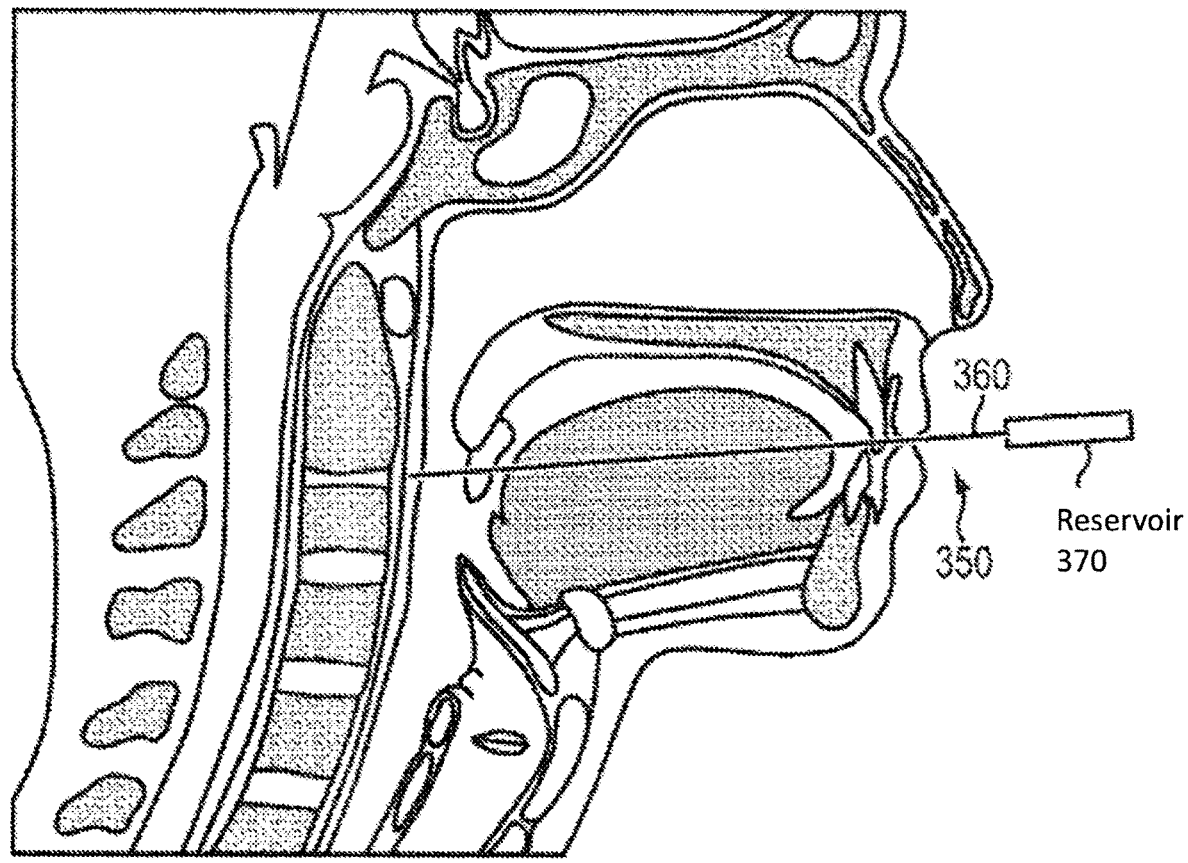
FIG. 4 depicts a side cross-sectional view of a human patient and a fourth exemplary embodiment of a cooling device.

With reference to FIG. 4, a cooling device 350 is configured to inject a cooling agent into the pharyngeal wall. In this embodiment, cooling device 350 comprises a shaft or needle 360 configured to pierce the oropharyngeal tissue and allow the clinician to inject therethrough a cooling agent, which is held at a chilled temperature in a reservoir 370 (e.g., a syringe). In other embodiments, cooling device 350 is coupled to a cooling unit similar to cooling unit 40 (shown in FIG. 1) in order to chill the liquid to the proper temperature, and to alert the clinician when this temperature has been achieved. Injection of the cooling agent causes cryolysis of adipose tissues and selectively removes or reduces fat cells from the tissues in the pharyngeal wall. In this embodiment, the cooling agent may be a water and glycerol mixture or any other physiologically harmless liquid capable of being chilled to the necessary temperature without freezing.

Figure 5:
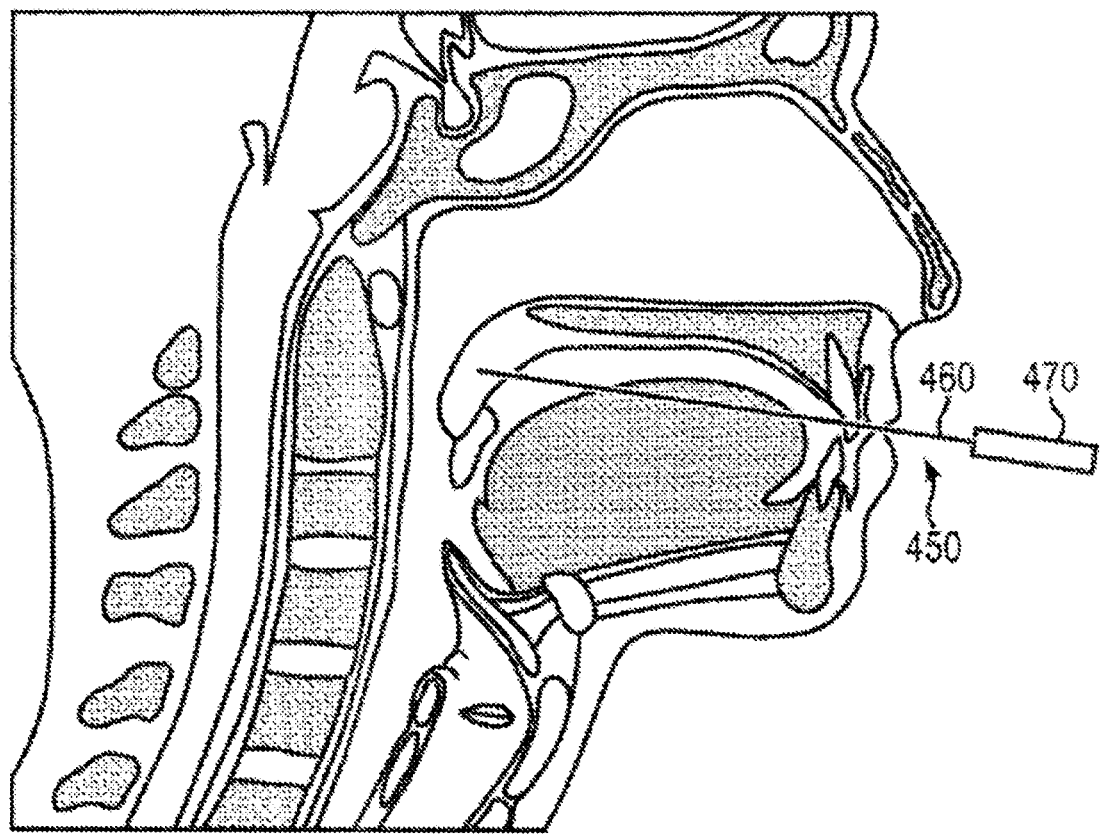
FIG. 5 depicts a side cross-sectional view of a human patient and a fifth exemplary embodiment of a cooling device.

As shown in FIG. 5, the cooling agent may be injected into the soft palate and/or uvula rather than the pharyngeal wall. In particular, a cooling device 450 comprises a shaft or needle 460 configured to inject a cooling agent stored in a reservoir 470 (e.g., a syringe). The operation is as described above in connection with FIG. 4.

Figure 6:
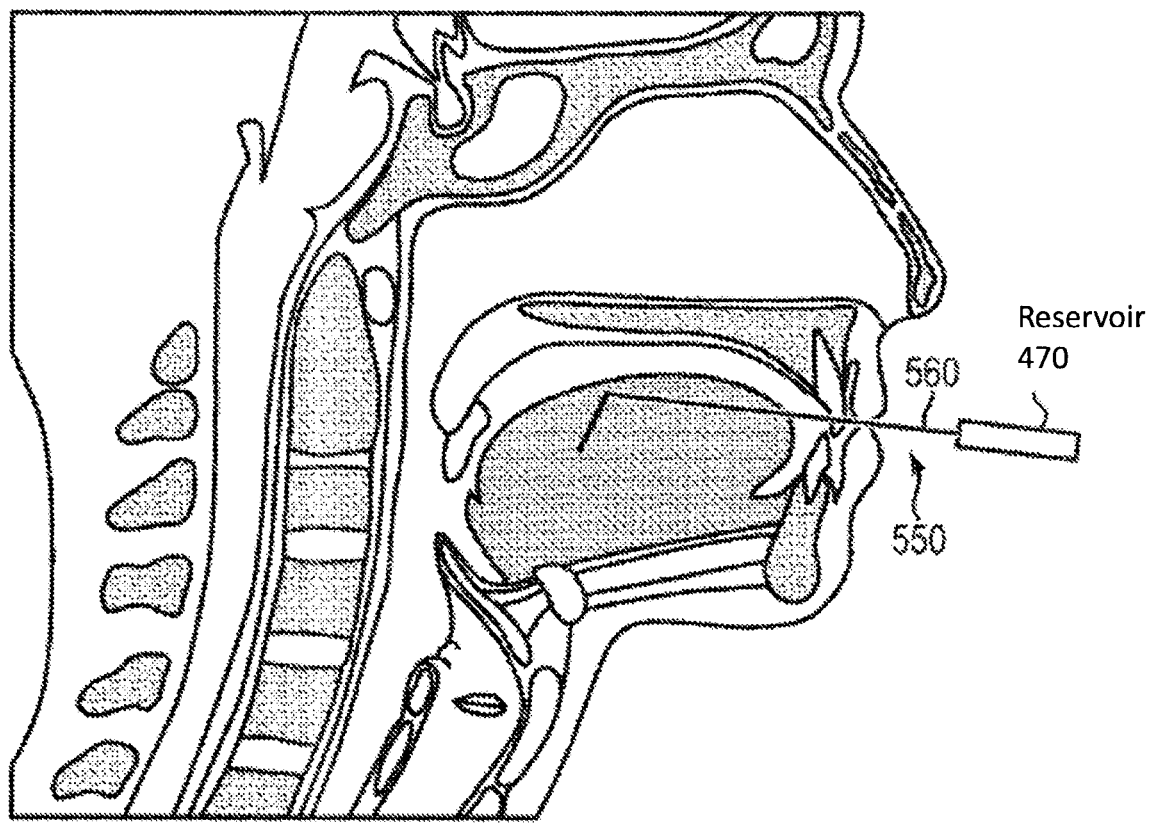
FIG. 6 depicts a side cross-sectional view of a human patient and a sixth exemplary embodiment of a cooling device.

Similarly, with reference to FIG. 6, the cooling agent may be injected into the base of the tongue. In particular, a cooling device 550 has an angled needle 560 shaped for convenient access to the area to be treated; once again the cooling agent is stored in a reservoir 470 (e.g., a syringe), and the operation is as described above in connection with FIG. 4.

Figure 7:
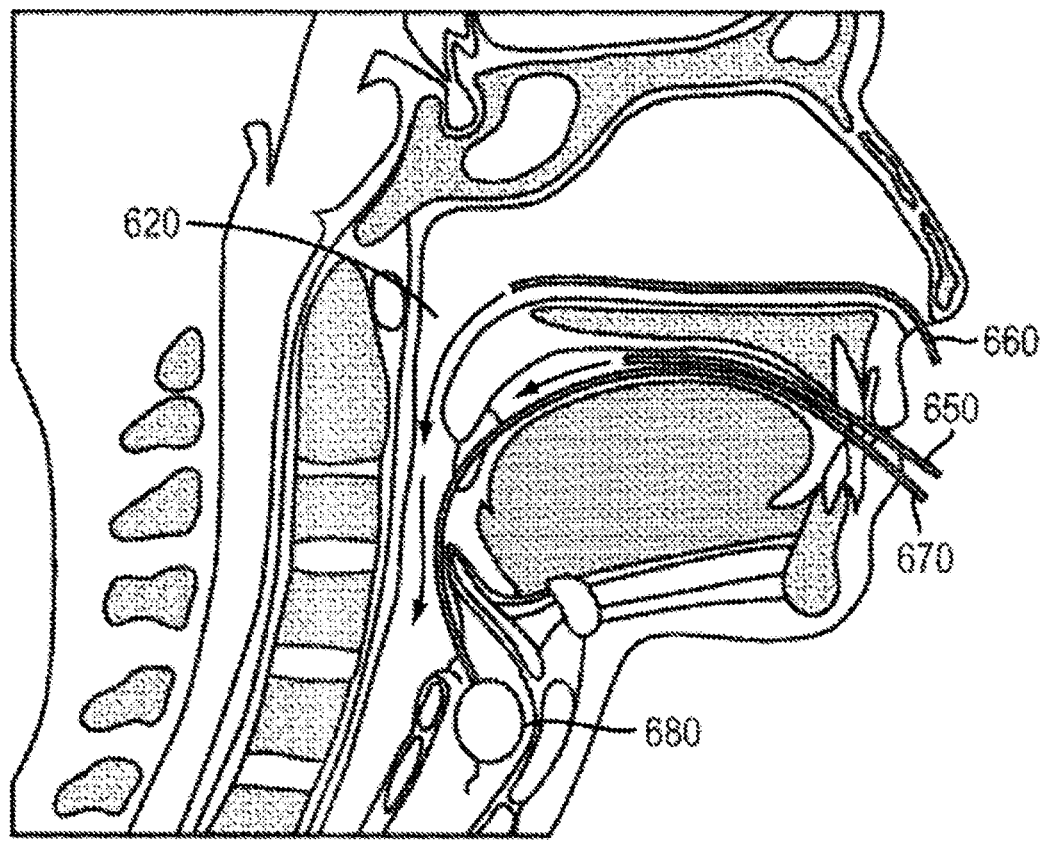
FIG. 7 depicts a side cross-sectional view of a human patient and a seventh exemplary embodiment of a cooling device.

In other embodiments, the tissue to be treated is cooled by means of exposure to chilled air rather than by mechanical contact or injection of a liquid. With reference to FIG. 7, cold air 620 be delivered to the oropharynx via an intraoral tube 650 and/or an intranasal tube 660 (e.g., a nasal cannula). It is understood that certain embodiments may use only an intraoral tube 650, while others may use an intranasal tube 660, while still other embodiments may use both. If cold air 620 is administered through the nasal cavity, the mouth will be closed to maintain the cool temperature. If the cold air is delivered intraorally, the nose will be occluded.

This can be accomplished with the patient awake or under general anesthesia. In certain embodiments, an intubation cuff 670 with an inflatable member 680 can be used to seal the esophagus and prevent cold air from entering the lower respiratory tract. Breathing air can be supplied to the lungs through the intubation cuff 670. The progress of the cooling procedure may be monitored by means of a temperature sensor within the oropharynx, in contact with the tissue to be treated, or introduced via a needle into the interior of that tissue.

In certain embodiments, the cold air is continuously delivered through one conduit and withdrawn via a proximally located conduit to maintain a temperature of approximately −20 to approximately 0° C. in the oropharynx. More generally the temperature in the oropharynx may be maintained between approximately −25° C. and 5° C., typically at a selected temperature that is kept within a clinical tolerance range, e.g., ±10% or ±5%. The inlet and outlet conduit orifices can be disposed relative to each other such that the entire region of interest is maintained at the desired temperature. In certain embodiments, the cold air will be administered from between approximately 1 minute to approximately 75 minutes; the specific amount of time depends on the patient's anatomy (i.e., the target amount of adipose tissue reduction) and clinical factors determined to bear on the likely responsiveness of the patient's tissue to treatment.

Figure 8A:
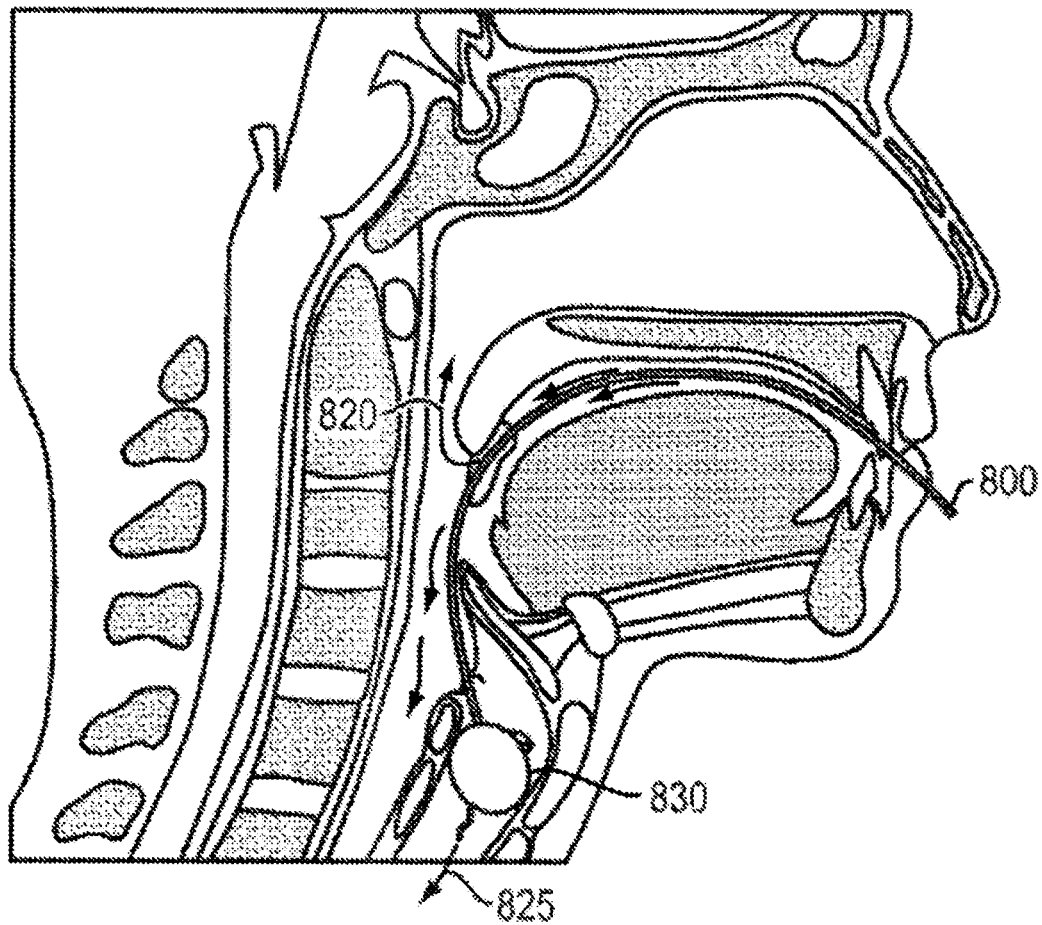
FIG. 8A depicts a side cross-sectional view of a human patient and a eighth exemplary embodiment of a cooling device.
Figure 8B:
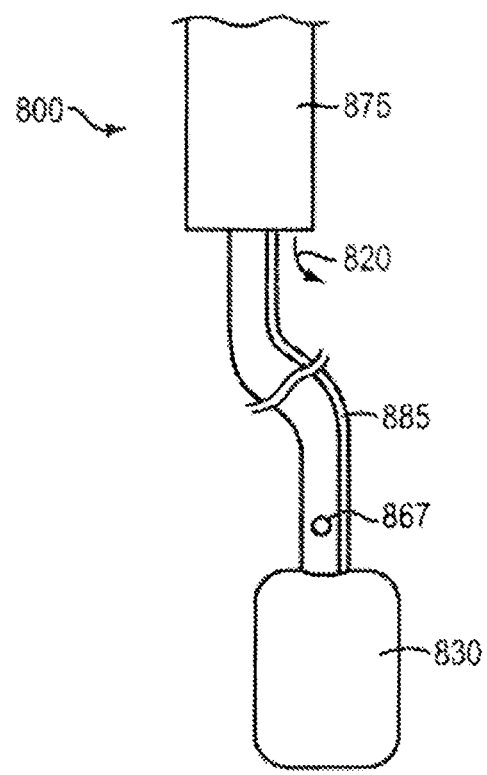
FIG. 8B schematically depicts the tubing arrangement of the eighth exemplary embodiment shown in FIG. 8A.
Figure 8C:
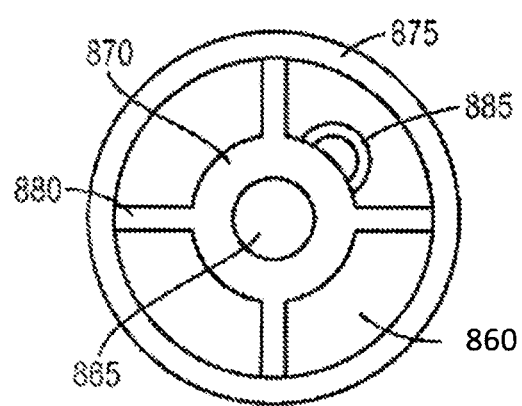
FIG. 8C depicts an end view of the truing arrangement of the eighth exemplary embodiment shown in FIG. 8A.

Alternatively, as depicted in FIGS. 8A-8C, rather than utilizing separate air delivery and withdrawal tubes, a dual-lumen tubular member 800 that provides both cold air 820 to the oropharynx and breathing air 825 to the lower respiratory tract may be employed. An inflatable member 830 can be used to seal the esophagus so that cold air 820 is restricted from entering the lower respiratory tract. In certain embodiments, dual-lumen tubular member 800 comprises an outer lumen 860 that allows cold air 820 to enter the oropharynx, and an inner lumen 865 that allows breathing air 825 to be delivered to the lower respiratory tract via a port 867. The tube 870 surrounding the inner lumen 865 includes the inflatable member 830 and is longer than the tube 875 surrounding the outer lumen 860, from which cold air 820 exits. As shown in FIG. 8C, these coaxial tubes 870, 875 may be kept separate (to establish and maintain the outer lumen 860) by means of ribs 880 running between the tubes. An inflation tube 885 running along the inner 870 (but fluidly independent thereof) facilitates inflation of the inflation member 830 by the clinician, e.g., via a bulb or by a pump within cooling unit 40. This configuration may be used in the embodiments shown in FIGS. 7 and 9 as well.

Figure 9:
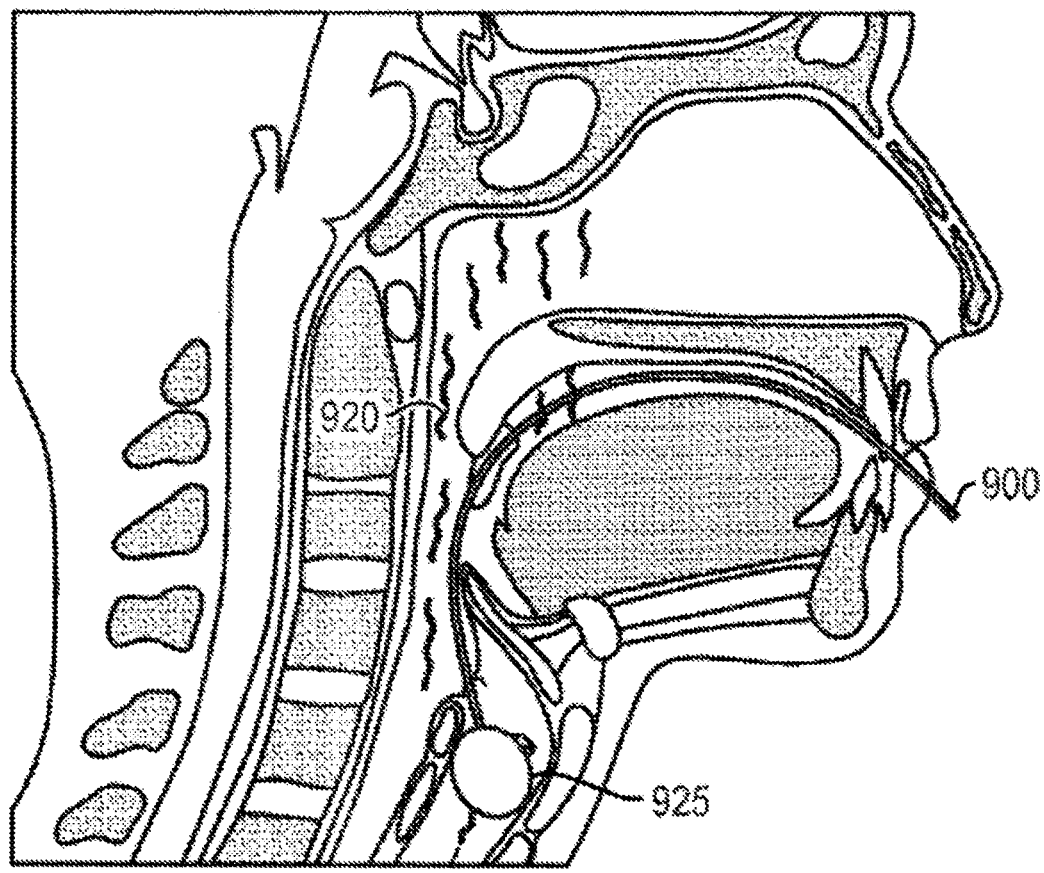
FIG. 9 depicts a side cross-sectional view of a human patient and a ninth exemplary embodiment of a cooling device.

With reference now to FIG. 9, a cold liquid 920 can be administered to an intubated patient in a manner similar to cold air in the embodiments shown in FIGS. 7 and 8. In exemplary embodiments the liquid is biocompatible with a freezing point less than water, e.g., an aqueous glycerin solution. The oral cavity/oropharynx is filled with the cold liquid 920, and an inflatable member 925 is inflated on the intubation tube 900 to prevent aspiration. The liquid may be continuously replenished or left in place. In certain embodiments, the temperature of liquid 920 is approximately −20 to approximately 0° C., or more generally, maintained between approximately −25° C. and 5° C., typically at a selected temperature that is kept within a clinical tolerance range, e.g., ±10% or ±5%. Between approximately −20 and approximately 0° C. and left in place or continually circulated for approximately 1 minute to approximately 75 minutes; the specific amount of time depends on the patient's anatomy (i.e., the target amount of adipose tissue reduction) and clinical factors determined to bear on the likely responsiveness of the patient's tissue to treatment.

The various illustrative embodiments of devices, systems, and methods described herein are not intended to be limited to the particular forms disclosed. Rather, they include all modifications and alternatives falling within the scope of the claims. The claims are not intended to include, and should not be interpreted to include, means-plus- or step-plus-function limitations, unless such a limitation is explicitly recited in a given claim using the phrase(s) "means for" or "step for," respectively.

What is claimed is:

1. A device for treatment of obstructive sleep apnea, comprising:
   a shaft;
   an engagement member disposed at a distal end of the shaft and having a contact surface shaped to be complementary to an oropharyngeal tissue target and to cool the oropharyngeal tissue target;
   a sensor disposed on the engagement member;
   a cooling unit;
   a lumen disposed in the shaft and in communication with the engagement member and the cooling unit to circulate a cooling fluid through the engagement member; and
   a processor operatively coupled to the cooling unit and the sensor, the processor being configured to responsively adjust a temperature of the cooling fluid with the cooling unit to achieve and maintain a desired temperature of the engagement member sufficient to cause cryolysis of adipose tissue within the oropharyngeal tissue target.

2. The device of claim 1, further comprising a coupler adapted to detachably connect the lumen to the cooling unit to receive the cooling fluid into the lumen and return the cooling fluid from the lumen to the cooling unit.

3. The device of claim 2, wherein the shaft includes at least one releasably engageable port communicating with the lumen, the at least one releasably engageable port being configured to detachably connect to the cooling unit via the coupler.

4. The device of claim 1, wherein the engagement member comprises a flexible and conformal material.

5. The device of claim 1, wherein the engagement member further comprises a hinge.

6. The device of claim 1, wherein the engagement member comprises a substantially flat plate.

7. The device of claim 1, wherein the engagement member comprises a "C"-shaped member configured to be complementary to a base of a tongue.

8. The device of claim 1, wherein the engagement member is comprises a "V"-shaped member configured to engage a soft palate or a uvula.

9. The device of claim 1, wherein the cooling unit is configured to provide suction to the engagement member to enhance mechanical contact thereof with the oropharyngeal tissue target.

10. The device of claim 1, wherein the cooling fluid comprises a liquid.

11. The device of claim 10, wherein the liquid comprises a refrigerant.

12. The device of claim 10, wherein the liquid comprises a water and glycerine solution.

* * * * *